(12) United States Patent
Beltman et al.

(10) Patent No.: US 7,781,007 B2
(45) Date of Patent: Aug. 24, 2010

(54) WATER-IN-OIL EMULSION WITH IMPROVED SPATTERING BEHAVIOUR

(75) Inventors: Rob Beltman, Vlaardingen (NL); Henricus Arnoldus Hendrickx, Vlaardingen (NL); Hindrik Huizinga, Vlaardingen (NL); Gerrit Leendert van der Schee, Rockanje (NL); Johannes Jacobus Warendorff, Vlaardingen (NL)

(73) Assignee: Conopco, Inc., Englewood, CA (US)

( * ) Notice: Subject to any disclaimer, the term of this patent is extended or adjusted under 35 U.S.C. 154(b) by 1111 days.

(21) Appl. No.: 10/582,281

(22) PCT Filed: Nov. 17, 2004

(86) PCT No.: PCT/EP2004/013057

§ 371 (c)(1), (2), (4) Date: Jun. 9, 2006

(87) PCT Pub. No.: WO2005/058067

PCT Pub. Date: Jun. 30, 2005

(65) Prior Publication Data

US 2008/0305221 A1    Dec. 11, 2008

(30) Foreign Application Priority Data

Dec. 9, 2003    (EP) .................................. 03079071

(51) Int. Cl.
A23D 7/00    (2006.01)
(52) U.S. Cl. .................. 426/604; 426/603; 426/629
(58) Field of Classification Search .................. 426/604
See application file for complete search history.

(56) References Cited

U.S. PATENT DOCUMENTS

| | | | |
|---|---|---|---|
| 3,194,665 A | * | 7/1965 | Pardun ...................... 426/604 |
| 3,245,802 A | * | 4/1966 | Pardun ...................... 426/604 |
| 3,415,659 A | | 12/1968 | Purves |
| 3,946,122 A | | 3/1976 | Scharp |
| 4,399,165 A | | 8/1983 | Tack et al. |
| 5,436,021 A | | 7/1995 | Bodor et al. |
| 6,942,890 B1 | * | 9/2005 | van Buuren et al. ......... 426/601 |
| 2002/0142088 A1 | | 10/2002 | Fabian et al. |
| 2003/0165607 A1 | * | 9/2003 | Sipila ........................ 426/601 |

FOREIGN PATENT DOCUMENTS

| | | | |
|---|---|---|---|
| EP | 0 477 825 B1 | | 4/1992 |
| EP | 0 771 531 B1 | | 5/1997 |
| EP | 0 775 444 B1 | | 5/1997 |
| GB | 378372 | | 7/1932 |
| WO | WO80/01232 | * | 6/1980 |
| WO | WO01/35756 | * | 5/2001 |
| WO | 01/84945 A1 | | 11/2001 |
| WO | WO02/45519 | * | 6/2002 |
| WO | 03/051136 A1 | | 6/2003 |

OTHER PUBLICATIONS

Anderson, A J C, 1965. Margarine. Pergamon Press, New York. p. 277-278.*
Hall, C. W. et al. 1971. Encyclopedia of Food Engineering. AVI Publishing Co., Inc. Westport, CT. p. 418-423.*
Hui, Y. H. 1996. Bailey's Industiral Oil and Fat Products, vol. 3, 5$^{th}$ edition. John Wiley & Sons, Inc., New York, p. 96-101.*
Copending U.S. Appl. No. 10/582,600 to Beltman et al. filed Jun. 9, 2006.
H. Pardun, in Fette, Seifen, Anstrichmittel 79 (5); 1977, pp. 195-203.
European Search Report Application No. EP 03 07 9071 completed May 10, 2004.

* cited by examiner

*Primary Examiner*—Carolyn A Paden
(74) *Attorney, Agent, or Firm*—Michael P. Aronson

(57) ABSTRACT

The invention relates to a water-in-oil emulsion food product with improved spattering behaviour comprising 0.1-5 wt. % of a porous powderous vegetable matter made from nuts, seeds, kernels, pits and cellulose having a volume weighted mean particle diameter ($d_{4,3}$) not exceeding 0.5 mm.

13 Claims, 1 Drawing Sheet

Processing Liquid Margarines

Processing Spreads Margarines

WATER-IN-OIL EMULSION WITH IMPROVED SPATTERING BEHAVIOUR

TECHNICAL FIELD

The invention relates to water-in-oil emulsion food products, in particular spreads and liquid margarines, showing improved spattering behaviour when used for shallow frying.

BACKGROUND AND PRIOR ART

The use of water-in-oil emulsions for frying often is accompanied by spattering. Usually a distinction is made between primary spattering and secondary spattering. Primary spattering occurs when a frying product contains a emulsion phase as well as a dispersed aqueous phase. When heating the emulsion to a temperature over 100° C. the dispersed water will evaporate under more or less spattering.

With secondary spattering is denoted spattering which occurs when water or a water containing food product such as meat is brought into a heated frying emulsion.

The present invention is related particularly to a method for improving secondary spattering behaviour. Secondary spattering behaviour is measured by determining the spattering value SV2 according to a protocol as specified in the examples section.

Common anti-spattering agents for water-in-oil emulsions comprise emulsifiers in a broad sense e.g. lecithin, hydrolysed lecithin, esters of citric acid (Citrem™) and cooking salt. The effect of sole lecithin on spattering is small. When lecithin is used in combination with cooking salt, well performing cooking emulsions having SV2 values up to 8 can be achieved. Lecithin, however, has the disadvantage that it may decompose at high frying temperatures and causes bad smell, discoloration and foaming. The cooking salt (specifically sodium chloride) is not recommended from a nutritional point of view, but has to be added in a substantial amount, exceeding 0.3 wt. % to get good spattering behaviour.

For improving spattering behaviour EP 477825 and EP 771531 disclose the use of citric acid esters as synthetic antioxidants.

U.S. Pat. No. 3,946,122 and U.S. Pat. No. 5,436,021 disclose water and oil emulsions comprising a citric acid ester of a mono- or diglyceride of fatty acids.

WO 01/84945 uses a citric ester of a partial fatty acid glyceride which results in SV2 values of at least 4.

EP 775444 discloses a pourable emulsion composition comprising herbs, spices, nuts or seeds and 1-10 wt % salt.

WO 03/051136 discloses a transparent oil which contains stably dispersed particles which may have a vegetable origin.

A relatively high salt content is typical for most prior art cooking oils which show an improved spattering behaviour. The presently available alternatives for lecithin and cooking salt consist of non-natural substances.

H. Pardun, in Fette, Seifen, Anstrichmittel 79(5), 1977, pp. 195-203 describes the use of milled soy protein concentrates as antispattering agents in margarines. The antispattering agents proposed by Pardun have the disadvantage that when heated in the pan during shallow frying, they may decompose and give char formation. Moreover, we have found that when margarines of Pardun are prepared using modern margarine equipment, such as a votator, the antispattering agents are no longer effective.

SUMMARY OF THE INVENTION

It is therefore an object of the invention to provide a water-in-oil emulsion food product having a good spattering performance in shallow frying. It is another object to provide healthy water-in-oil emulsion spreads or liquid margarines, in particular having a low amount of salt. A further object is to provide a water-in-oil emulsion food product having a lower fat content, e.g. around 60 wt. % fat, or even lower, while maintaining good spattering performance. Still one more object is to provide such food products which avoid char formation during shallow frying. One or more of these objects are attained according to the invention which provides a water-in-oil emulsion food product with improved spattering behaviour comprising 0.1-5 wt. % of a porous powderous vegetable matter made from nuts, seeds, kernels, pits and cellulose having a volume weighted mean particle diameter $(d_{4,3})$ not exceeding 0.5 mm.

The invention further relates to a process for the preparation of a water-in-oil emulsion food product comprising porous powderous vegetable matter having a volume weighted mean particle diameter $(d_{4,3})$ not exceeding 0.5 mm, wherein the process involves at least one process step in which the pressure is 0.20 MPa (2 bar) or more and wherein the porous powderous vegetable matter is not subjected to any pressure of 0.20 MPa (2 bar) or more.

DETAILS OF THE INVENTION

Figure 1:
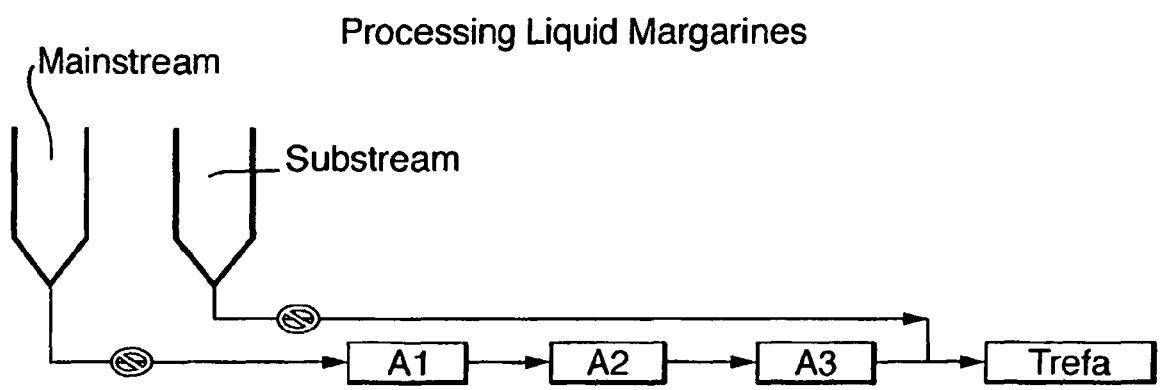
FIG. 1 shows a process scheme for the process according to the invention suitable for the production of liquid margarines.

Water-in-oil emulsion spreads or water-in-oil emulsion liquid margarines may hereinafter collectively be referred to as water-in-oil emulsion food products.

All weight percentages (wt. %) herein are calculated based on total weight of the food product, unless otherwise indicated.

All pressures (MPa or bar) herein are effective pressures.

A water-in-oil emulsion food product is herein understood to contain more than 5 wt. % of a waterphase. Preferably the water-in-oil emulsion food product comprises 15 wt. % or more and more preferably 25 wt. % or more, even more preferably 35 wt. % or more waterphase. In particular, the invention is suitable for water-in-oil emulsion product having about 60 wt. % fat or less, i.e. 40 wt. % waterphase or more.

The water-in-oil emulsion food products according to the present invention may be produced according to a process, which comprises the following steps:

a. selecting a water-in-oil emulsion, b. selecting emulsion insoluble vegetable matter having a consistency which allows milling to a powder, c. milling the vegetable matter to a powder having an average particle size not exceeding 0.5 mm, d. admixing the resulting powder to the water-in-oil emulsion in an amount of 0.1-5 wt. % on oil and getting it evenly dispersed throughout the water-in-oil emulsion.

Preferably, in the process according to the invention, the porous powderous vegetable matter is added to the waterphase of the water-in-oil emulsion.

Alternatively in a preferred embodiment, the porous powderous vegetable matter is added as a water containing slurry to the fatphase of the water-in-oil emulsion.

The water-in-oil emulsion food product may comprise any conventional ingredients in the oil phase and in the water phase. The shape water-in-oil emulsion food product may be any conventional shape, and includes products that are packed in a wrapper, products that are suitable for packing in a tub and liquid products that may be packaged in a (squeezable) bottle.

In case the water-in-oil emulsion food product is a liquid frying product or margarine, the oil phase of the water-in-oil emulsion food products optionally comprises an emulsion structuring component which imparts stability to the final product. Hydrogenated high erucic rapeseed oil is a well known most preferred emulsion structuring component which keeps powder particles and aqueous phase droplets stably dispersed. Other suitable emulsion structuring components comprise hydrogenated fish oil, hydrogenated ground nut oil, hydrogenated sunflower oil and mixtures thereof. The amount of emulsion structuring component suitably is 0.15 wt. % for cooking oils and 2 wt. % for cooking emulsions.

The vegetable matter to be added preferably consists of one or more substances selected from the group consisting of fruits (e.g. dried olives), nuts (e.g. almond, walnut, cashew nut, ground nut, pine tree nut), seeds (e.g. sunflower seed, linseed), beans (e.g. soybeans), kernels and pits (e.g. olive kernels) and cellulose.

The volume weighted mean diameter ($d_{4,3}$) of the powder particles which is close to the modal diameter must not exceed 0.5 mm. Preferably it does not exceed 0.1 mm and more preferably not 0.04 mm.

For grinding the soft to medium-hard and fibrous materials which are used for the present invention a Retsch ZM100 ultracentrifugal mill is especially suitable. The aperture size of the mill's sieve suitably is 0.2 mm.

When the vegetable matter selected for the invention contains oil or fat, it may be subjected to a defatting treatment before the milling step in order to impart to the powder the desired anti-spattering properties. Extraction may be done using any known extracting method and any extractant suitable for extracting oil, for example organic solvent or a liquified gas such as liquified carbon dioxide. Extraction with hexane delivers a suitable defatting (or deoiling) result. For substances having only a low oil or fat content defatting may appear to be less necessary, but nevertheless the extraction may enhance anti-spattering behaviour.

Preferably, the porous powdery vegetable matter is prepared by milling vegetable matter. More preferably, the porous powdery vegetable matter is prepared by milling and extracting oil from oil containing vegetable matter. Advantageously, the vegetable matter is pre-milled, oil-extracted and then the extracted vegetable matter is milled to prepare the porous powdered vegetable matter.

Optionally, the water-in-oil emulsion food product comprises other ingredients such as lecithin or another emulsifying substance, colouring agent, flavour components or salt. Lecithin and salt are common anti-spattering agents. In the present cooking oil they are redundant, but nevertheless they may be present for other reasons, the lecithin for its desired browning and foaming effect and the salt for imparting taste.

Preferably the emulsion resulting from the present invention is substantially free from cooking salt.

The powder resulting from the milling may be admixed to the water-in-oil emulsion food product in an amount which is 0.1-5.0 wt. % and preferably is selected from the range 0.2-1.0 wt. % on product.

A particularly preferred powder consists of milled kernels of olives or of milled seeds or beans such as sunflower seed, linseed and soybeans.

The water-in-oil emulsion food products resulting from the invention shows such improved spattering behaviour that its SV1 value is at least 8 and its SV2 value at least 6, preferably SV1 is at least 9 and SV2 at least 8, more preferably SV1 is at least 9 and SV2 at least 9.

The food products may be all kinds of food products, for instance marinades, sauces, seasonings, batter, spray products, spreads, liquid shallow frying products and/or seasonings.

Preferably, food products according to the invention are spreads, margarines (water in oil or oil in water emulsions), mayonnaises (oil in water emulsions), dairy products such as fresh cheese (oil in water emulsions) and dressings (oil in water emulsions). For example margarines may be prepared by using a votator process. Cheese can be prepared by for example a standard soft cheese or fresh cheese production process.

EXAMPLES

Determination of Spattering Value in a Spattering Test

Primary spattering (SV1) was assessed under standardised conditions in which an aliquot of a food product was heated in a glass dish and the amount of fat spattered onto a sheet of paper held above the dish was assessed after the water content of the food product had been evaporated by heating.

Secondary spattering (SV2) was assessed under standardised conditions in which the amount of fat spattered onto a sheet of paper held above the dish is assessed after injection of a quantity of 10 ml water into the dish.

In assessment of both primary and secondary spattering value, 25 g food product was heated in a 15 cm diameter glass dish on an electric plate to about 205° C. The fat that spattered out of the pan by force of expanding evaporating water droplets was caught on a sheet of paper situated at 25 cm above the pan (SV1 test). Subsequently a quantity of 10 ml water was injected into the dish and again the fat that spattered out of the pan by force of expanding evaporating water droplets was caught on a sheet of paper situated above the pan (SV2 test).

The images obtained were compared with a set of standard pictures number 0-10 whereby the number of the best resembling picture was recorded as the spattering value. 10 indicates no spattering and zero indicates very bad spattering. The general indication is as follows in table 1.

TABLE 1

Scoring table for spattering value

| Score | Comments |
|---|---|
| 10 | Excellent |
| 8 | Good |
| 6 | Passable |
| 4 | Unsatisfactory for SV1, almost passable for SV2 |
| 2 | Very poor |

Typical results for household margarines (80 wt. % fat) are 8.5 for primary spattering (SV1) and 4.6 for secondary spattering (SV2) under the conditions of the above mentioned test.

Measuring Oil Separation

A plastic bottle of 500 ml, width: 57 mm, height 160 mm was filled with the sample up to a filling height of 150 mm. After four weeks storage at 25° C. the thickness of the separated oil layer is measured and expressed as vol. % on total sample volume. The vol. % is the rating for emulsion stability.

Measuring Pourability

Pourability for pourable compositions according to the invention is measured according to the standard Bostwick protocol. The Bostwick equipment consists of a 125 ml reservoir provided with a outlet near the bottom of a horizontally placed rectangular tub and closed with a vertical barrier. The tub's bottom is provided with a 25 cm measuring scale, extending from the outlet of the reservoir. When equipment and sample both have a temperature of 15° C., the reservoir is filled with 125 ml of the sample after it has been shaken by hand ten times up and down. When the closure of the reservoir is removed the sample flows from the reservoir and spreads over the tub bottom. The path length of the flow is measured after 15 seconds. The value, expressed as cm per 15 seconds is the Bostwick rating, which is used as yard stick for pourability.

Measurement of pH and Salt Content

The pH of a food composition is measured as follows. The aqueous phase is separated from the oil phase by heating the composition to 90° C. for 45 minutes and then centrifuging the heated composition at 2800 rotations per minute for 5 minutes. The emulsions are separated due to this treatment into a distinct aqueous phase and a distinct oil phase. The phases were separated through decantation and the pH of the aqueous phase was measured with a pH measuring probe connected to a pH meter. Salt content can be analysed using elemental analysis.

Example 1

Preparation of an Edible Water-in-Oil Emulsion

A pourable margarine was prepared with the composition shown in table 2:

TABLE 2

Composition of pourable margarine

| Ingredient | Amount (wt. %) |
|---|---|
| Oil phase | |
| Sunflower oil | 79.62 |
| RP 70 | 1.95 |
| Lecithin Bolec MT[1] | 0.18 |
| Fractionated lecithin Cetinol[2] | 0.10 |
| Beta-carotene (0.4 wt. % solution in sunflower oil) | 0.15 |
| Water phase | |
| Water | 16.0 |
| Sodium chloride | 1.5 |
| Soy flour[3] | 0.5 |

Explanation of table 2:
The balance of all composition to 100% is water
RP 70: Rapeseed oil hardened to a slip melting point of 70° C.
[1]Lecithin was hydrolysed soybean lecithin (Bolec MT) obtained from UMZ (Unimills Zwijndrecht, Netherlands)
[2]Alcohol-soluble fraction from fractionation of native soybean lecithin with alcohol; Cetinol from UMZ.
[3]Soyflour prepared by milling Nutrisoy ® 7B (commercially available from ADM) and sieving the resulting fine powder through on a 0.5 mm sieve, the sieve fraction (<0.5 mm) being retained.

For size comparison of various samples the volume weighted mean diameter ($d_{4,3}$) is measured. The volume weighted mean diameter ($d_{4,3}$) suitably is measured in a Malvern Mastersizer S, a gauge based on laser light scattering. The apparatus is filled with the refined sunflower oil. Powdered material is added until 20% obscuration (80% of original maximal signal) is reached (about 0.5 g added), whereafter actual measurement is started. For calculation of the value of $d_{4,3}$ the Mie theory is used with the following parameters/values: Solvent refractive index 1.4694; Particle refractive index, Real part: 1.5300; Particle refractive index, Imaginary part: 0.1.

Preparation of Model Emulsions

The oil phase used for the model emulsions was prepared by dissolving the oil soluble components in sunflower oil in a glass beaker. Lecithin and special ingredients as written in table 1 are added at approximately 65° C. The water phase was prepared by dissolving all water-soluble ingredients in de-mineralised water at 65° C., then adjusting the pH using a 10% citric acid solution. While stirring the fat phase with a propeller-mixer (rpm±350) the water phase was added. After stirring the emulsion for 10 min, the temperature must be lowered to approximately 20° C. Subsequently the pre-crystallised RP 70 could slowly be added as 10% slurry in SF in an amount to reach a final concentration of 1.95% RP 70 on product. The pre-crystallised RP 70 slurry was dispersed in the emulsion at ambient temperatures by stirring with the propeller at ±725 rpm for 30 min. Each sample was prepared on a 200 g scale and was stored at 15° C. for 1 day before analyzing.

The spattering values of the liquid margarine are given in table 3.

Examples 2 and 3

Example 1 was repeated, but now with 0.3 wt. % (example 2) and 0.7 wt. % soy flour (example 3). The amount of water was adjusted such that the total composition remained 100 wt. %. The spattering values of the liquid margarines are given in table 3.

Examples 4-6

Example 1 was repeated, but instead of adding the soy flour to the waterphase, the soy flour was added to the oil phase in amounts as indicated in table 3. The spattering values of the liquid margarines are given in table 3.

Comparative Experiment A

Example 1 was repeated, but now without soyflour. The spattering values of the liquid margarine are given in table 3.

TABLE 3

Results of spattering tests of examples 1-6 and comparative experiment A

| Example | Amount of soy flour (wt. %) | Soyflour added to | SV1 | SV2 |
|---|---|---|---|---|
| 1 | 0.5 | Waterphase | 10 | 9 |
| 2 | 0.3 | Waterphase | 10 | 9 |
| 3 | 0.7 | Waterphase | 10 | 8.5 |
| 4 | 0.5 | Oil phase | 8 | 6 |
| 5 | 0.3 | Oil phase | 9 | 5 |
| 6 | 0.7 | Oil phase | 8.5 | 5 |
| A | 0 | — | 7 | 5 |

It can be concluded that addition of soy flour (milled soy) to the waterphase results in very good spattering results, both for SV1 and SV2. Addition of the same amounts of soy flour to the fat phase resulted in some improvement of SV1 compared to the blank A, but hardly or no improvement of SV2. Therefore the addition of powdered vegetable matter to the water phase is preferred.

Examples 7-10

Example 1 was repeated, but now using 0.5 wt. % milled sunflower pits instead of soybean flour. The milled sunflower pits were sieved and different sieve fractions were used as described in table 4. The results are given in table 4. The milled sunflower pits were added to the water phase.

TABLE 4

Results of spattering tests of examples 7-10

| Example | Sieve size (mm) | SV1 | SV2 |
|---|---|---|---|
| 7 | 2 | 10 | 9 |
| 8 | 1.5 | 10 | 9 |
| 9 | 1 | 10 | 9 |
| 10 | 0.2 | 10 | 9 |

From table 4, it is clear that milled sunflower pits are good antispattering agents and that particle size does not influence the spattering values, however large particles may be disadvantageous for other product properties.

Similar antispattering results were obtained using other porous powderous vegetable matter made by milling nuts, seeds, kernels, pits and cellulose, e.g. olive kernels or linseed.

Example 11 and Comparative Experiment B

Example 1 was repeated, but now with 60 wt. % fat phase. The compositions and results are shown in table 5.

TABLE 5

Composition data and results of example 11 and comparative experiment B

| Ingredient | Comp. Ex. B (wt. %) | Example 11 (wt. %) |
|---|---|---|
| Rapeseed oil | 57.52 | 57.52 |
| Hardstock RP 70 | 1.95 | 1.95 |
| Lecithin Bolec MT | 0.18 | 0.18 |
| Lecithin Cetinol | 0.1 | 0.1 |
| Beta-carotene (4% in sunflower oil) | 0.15 | 0.15 |
| Water | 39.3 | 38.8 |
| Salt | 0.8 | 0.8 |
| Soy flour | — | 0.5 |
| Spattering values | | |
| SV1 | 3 | 9 |
| SV2 | 1 | 8 |

60 wt. % fat products usually have a very bad spattering behaviour, this is supported by the data in table 5 for comparative experiment B. By addition of soy flour, good spattering results are achieved (example 11).

Examples 12-16

The compositions prepared in these examples are given in table 6, in which the ingredients have the same explanation as in table 1.

TABLE 6

Composition data of examples 12-16.

| Ingredient | Example 12 | Example 13 | Example 14 | Example 15 | Example 16 |
|---|---|---|---|---|---|
| | Amount (wt. %) | | | | |
| Oil phase | | | | | |
| Rapeseed oil | 67.68 | 47.71 | 47.66 | 47.66 | 47.66 |
| Hardstock (RP 70) | 1.95 | 1.95 | 1.95 | 1.95 | 1.95 |
| Slurry of 0.5 wt. % Soy flour, 1.0 wt. % water and 20 wt. % oil, amounts based on total composition | — | 21.5 | 21.5 | 21.5 | 21.5 |
| Lecithin Bolec MT | 0.18 | 0.18 | 0.18 | 0.23 | 0.28 |
| Fractionated lecithin Cetinol | 0.10 | 0.10 | 0.10 | 0.05 | — |
| Beta-carotene | 0.063 | 0.063 | 0.063 | 0.063 | 0.063 |
| Water phase | | | | | |
| Water | 28.0 | 27.0 | 27.0 | 27.0 | 27.0 |
| Sodium chloride | 1.5 | 1.5 | 1.5 | 1.5 | 1.5 |
| Soy flour | 0.5 | — | — | — | — |

Preparation of a Liquid Frying Product

Hardstock RP 70 (fully hydrogenated rapeseed oil with a slip melting point of 70° C.) is heated to 70° C. and mixed with the remaining part of the fat-soluble ingredients to for the fat phase at 55° C.

The food composition is processed on a pilot-plant-scale unit consisting of the sequence A-A-A-Trefa unit. The premix is prepared in the premix tank at 60° C. In the first A-unit the emulsion is cooled to 11° C., in the second A-unit to 8° C. and in the third A-unit to 5° C. Afterwards the Trefa-unit introduces nitrogen into the emulsion. The throughput of the process is 80 kg/hr. The Trefa-unit is an aeration unit (Aeration Machine Type T-50 of Trefa Continu Aerating Systems b.v., Doesburg, Netherlands).

TABLE 7

Processing details for examples 12-16 and Comp. Ex. C

| Process Unit | | A1-unit | A2-unit | A3-unit | Trefa |
|---|---|---|---|---|---|
| Annular space | Mm | 5.0 | 3.5 | 3.5 | — |
| Rotation speed | Rpm | 1000 | 1000 | 1000 | 350 |
| Exit Temperature | ° C. | 11 | 8 | 5 | 7 |
| N2 input | l/hr | — | — | — | 5.5 |
| Nitrogen content | % | — | — | — | 5 |

The results are given in table 8.

TABLE 8

Result of examples 12-16

| Property | Example 12 | Example 13 | Example 14 | Example 15 | Example 16 |
|---|---|---|---|---|---|
| D3,3 (μm) | 7.4 | 7.7 | 6.6 | 6.6 | 6.4 |
| SV1 (-) | 6.0 | 9.5 | 8.0 | 8.0 | 8.5 |
| SV2 (-) | 5.5 | 7.3 | 7.0 | 7.0 | 7.0 |
| Bostwick (fresh) | 3.5 | 4.0 | 3.5 | 4.0 | 4.0 |
| Bostwick (8 weeks) | 3.5 | 3.0 | 4.0 | 4.5 | 4.5 |
| Oil exudation (12 wks) | 0% | 0% | 0% | 0% | 0% |

Examples 12-16 show that using soyflour, liquid frying products and liquid margarines may be prepared, having high stability, good pourability and good antispattering properties. Addition of the soy flour as water-containing slurry to the oil phase during preparation of the emulsion gives better results than adding soy flour to the waterphase.

Examples 17-21

The compositions prepared in these examples are given in table 9, in which the ingredients have the same explanation as in table 1. The compositions were prepared in the same way as described in examples 12-16. The results are given in table 10.

TABLE 9

Composition data of examples 17-20

| Ingredient | Example 17 | Example 18 | Example 19 | Example 20 |
|---|---|---|---|---|
| | | Amount (wt. %) | | |
| Oil phase | | | | |
| Rapeseed oil | 79.62 | 79.12 | 79.12 | 79.12 |
| Hardstock (RP 70) | 1.95 | 1.95 | 1.95 | 1.95 |
| Lecithin Bolec MT | 0.18 | 0.18 | 0.18 | 0.23 |
| Fractionated lecithin Cetinol | 0.10 | 0.10 | 0.10 | 0.05 |
| Beta-carotene | 0.15 | 0.15 | 0.15 | 0.15 |
| Water phase | | | | |
| Water | 17.0 | 16.5 | 16.7 | 17.1 |
| Potassium chloride | 1.0 | 1.0 | 0.8 | 0.4 |
| Soy flour | 0 | 0.5 | 0.5 | 0.5 |

TABLE 10

Results of examples 17-20

| Property | Example 17 | Example 18 | Example 19 | Example 20 |
|---|---|---|---|---|
| SV1 (—) | 7.0 | 10.0 | 10.0 | 10.0 |
| SV2 (—) | 5.0 | 8.5 | 8.5 | 8.5 |

The data in table 10 show that even when sodium chloride, which is known to be a very strong antispattering agent is omitted, and replaced by potassium chloride, good antispattering results are found. Omission of sodium chloride may be advantageous for health reasons.

Examples 22 and 23 and Comparative Experiment C

Preparation of a 70 wt. % Spread and 60 wt. % Fat Spreads

Figure 2:
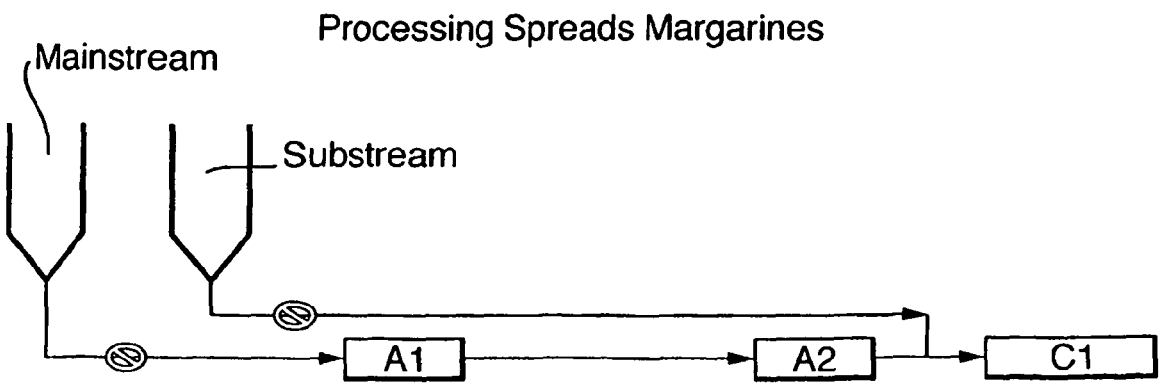
FIG. 2 shows a process scheme for the process according to the invention suitable for the production of fat spreads or margarines.

In examples 22 and 23, a process was used having a main-stream and a sub-stream, as depicted in FIG. 2. The sub-stream contains the protein/water slurry mixed with a part of the oil from the fat blend used.

In the A1-A2-C sequence, the (over) pressure in the system just before the crystalliser was almost zero. This was the point where the main-stream and sub-stream came together.

The sub-stream contained 6% of Nutrisoy and the throughputs for the trials were 4.6 kg/hr for the main-stream and 0.4 kg/hr for the sub-stream, resulting in 0.5% protein in the final product.

The main-stream was treated as a normal premix, hence starting at 55-60° C. The sub-stream is temperature-controlled at a level given by the temperature ex A2, in this case 10° C.

| | A1 | A2 | C1 |
|---|---|---|---|
| Temperatures: | 17° C. | 10° C. | 13° C. |
| Volumes | 18 ml | 18 ml | 75 ml |
| RPMs | 800 | 800 | 200 |

Product Formulation

Based on the throughputs mentioned above the two streams should have the compositions as in table 11 in order to achieve the correct final formulation.

Example 22 thus results in a 70% fat spread and example 23 in a 60% fat spread, both containing 0.5% of the Nutrisoy.

TABLE 11

Composition of process streams and final product composition of examples 22 and 23

| | Example 22 | | | Example 23 | | |
|---|---|---|---|---|---|---|
| Ingredient | Main stream | Sub stream | Final product | Main stream | Sub stream | Final product |
| Fat blend (composition given in table 12) | 66.23 | 85.00 | 68.44 | 56.23 | 85.00 | 58.53 |
| Beta-carotene | 0.44 | 0 | 0.40 | 0.44 | 0 | 0.40 |
| Sunflower lecithin | 0.22 | 0 | 0.20 | 0.22 | 0 | 0.20 |
| Others | 0.11 | 0 | 0.10 | 0.11 | 0 | 0.10 |
| Total fat phase | 67.00 | 85.00 | 68.44 | 57.00 | 85.00 | 59.24 |
| Water | 32.05 | 9.00 | 30.21 | 42.05 | 9.00 | 39.41 |
| Soy flour | 0 | 6.00 | 0.48 | 0 | 6.00 | 0.48 |
| Sodium chloride | 0.56 | 0 | 0.52 | 0.56 | 0 | 0.52 |
| Sour whey powder | 0.22 | 0 | 0.20 | 0.22 | 0 | 0.20 |
| Potassium sorbate | 0.17 | 0 | 0.16 | 0.17 | 0 | 0.16 |
| Total water phase | 33.00 | 15.00 | 31.56 | 43.00 | 15.00 | 40.76 |

TABLE 12

Fatty acid composition of the fat phase of examples 22, 23 and comparative experiment C.

| Fatty acid | Amount (wt. %) |
|---|---|
| C8 | 0.0 |
| C10 | 0.0 |
| C12 | 0.0 |
| C14 | 0.0 |
| C16 | 4.3 |
| C16:1 | |
| C18 | 1.7 |
| C18:1 | 63.2 |
| C18:2 | 20.1 |
| C18:3 | 9.8 |
| C20 | 0.6 |
| C20:1 | |
| C20:1 | |

TABLE 12-continued

Fatty acid composition of the fat phase of examples 22, 23 and comparative experiment C.

| Fatty acid | Amount (wt. %) |
| --- | --- |
| C22 | 0.3 |
| C22:1 | |
| C22:2 | |
| C24 | 0.0 |

In comparative experiment C example 23 was repeated, but now only a main stream, corresponding to the main and substream of example 23 was used. The soy flour thus passed through the A1 and A2 units in comparative experiment C.

The results of examples 22 and 23 and comparative experiment C are given in table 13.

TABLE 13

Results of examples 22 and 23 and comparative experiment C

| Property | Example 22 | Example 23 | Comparative Exp. C |
| --- | --- | --- | --- |
| Fat level | 70 | 60 | 60 |
| SV1 (-) | 8.5 | 8 | 4 |
| SV2 (-) | 7 | 7.5 | 1 |

Table 13 shows that when the soy flour is subjected to high pressure in the A-units, it is no longer effective as an antispattering agent. Furthermore it shows that spreads with good antispattering properties may be prepared at 70 wt. % fat and even at 60 wt. % fat.

It was observed that in all products in which soy flour was used in the water phase of a water-in-oil emulsion food product, the particles of soy flour showed swelling under the influence of the water, which leads to increased diameter of the soy flour particles. The size of the swollen soy flour particles in the water-in-oil emulsion food product was 6 to 8 times that of the volume weighted mean particle size $d_{4,3}$ of the soy flour. For the purpose of this invention the volume weighted mean particle size $d_{4,3}$ of the soy flour is that of non-swollen particles.

The invention claimed is:

1. Process for the preparation of a water-in-oil emulsion food product with improved spattering behaviour, said food product comprising porous powderous vegetable matter having a volume weighted mean particle diameter ($d_{4,3}$) not exceeding 0.5 mm, wherein the process comprises:
   i. preparing a water-in-oil emulsion in at least one process step in which the pressure is 0.2 mPa or more,
   ii. admixing with the water-in-oil emulsion a porous powderous vegetable material in an amount of 0.1-5 wt. % on oil, said powderous vegetable matter being a powder formed by milling vegetable matter which has been extracted with an organic solvent to a powder having a particle size not exceeding 0.5 mm;
   wherein the porous powderous vegetable matter is not subjected to any pressure of 0.20 mPa or more in the process;
   wherein the porous powderous vegetable matter is a powder made from nuts, sunflower seeds, kernels, pits and cellulose.

2. Process according to claim 1, wherein the vegetable matter has been pre-milled, oil-extracted and then milled again to prepare the porous powdered vegetable matter.

3. Process according to claim 1, wherein the porous powderous vegetable matter is added to the water phase of the water-in-oil emulsion.

4. Process according to claim 1, wherein the porous powderous vegetable matter is added as a water containing slurry to the fat phase of the water-in-oil emulsion.

5. Process according to claim 1, wherein the porous powderous vegetable matter is evenly dispersed throughout one or more phases of the water-in-oil emulsion.

6. Process according to claim 1, wherein the volume weighted mean particle diameter ($d_{4,3}$) of the porous powderous vegetable matter does not exceed 0.1 mm.

7. Process according to claim 1, wherein 0.4-1.0 wt. % of the porous powderous vegetable matter is admixed with the water-in-oil emulsion.

8. Process according to claim 1, wherein the porous powderous vegetable matter consists of milled kernels of olives.

9. Process according to claim 1, wherein the porous powderous vegetable matter consists of milled sunflower seeds.

10. Process according to claim 1, wherein the porous powderous vegetable matter consists of milled soybeans.

11. Process according to claim 1, wherein the porous powderous vegetable matter consists of milled nuts selected from the group consisting of pine tree nuts, almonds, ground nuts, walnuts and cashew nuts.

12. Process according to claim 1, wherein the water-in-oil emulsion is substantially free from cooking salt.

13. Process according to claim 1, wherein the volume weighted mean particle diameter ($d_{4,3}$) of the porous powderous vegetable matter does not exceed 0.04 mm.

* * * * *